United States Patent [19]

Watson

[11] Patent Number: 4,882,004
[45] Date of Patent: Nov. 21, 1989

[54] COMPACT TABLETOP MACHINE FOR MAKING LABELS AND OTHER LAMINATIONS

[76] Inventor: Douglas M. Watson, 3684 Forest Park Blvd., St. Louis, Mo. 63108

[21] Appl. No.: 137,770

[22] Filed: Dec. 24, 1987

[51] Int. Cl.$^4$ .......................................... B32B 31/12
[52] U.S. Cl. ..................................... 156/381; 83/343; 156/239; 156/248; 156/267; 156/268; 156/522; 156/552; 156/570
[58] Field of Search ............... 156/230, 239, 248, 267, 156/268, 270, 516, 522, 552, 570, 569, 381; 83/343, 563, 571; 29/110, 126, 130, 148.4 R, 148.4 D, 149.5 R, 149.5 DP; 425/184, 186, 188, 194

[56] References Cited

U.S. PATENT DOCUMENTS

| | | | |
|---|---|---|---|
| 2,277,313 | 3/1942 | Fowler | 425/194 |
| 3,698,990 | 10/1972 | Shields | 156/381 |
| 4,306,928 | 12/1981 | Okui | 156/268 |
| 4,594,125 | 6/1986 | Watson | 156/248 |
| 4,680,080 | 7/1987 | Instance | 156/552 |

Primary Examiner—Jan H. Silbaugh
Assistant Examiner—Jill L. Heitbrink
Attorney, Agent, or Firm—Senniger, Powers, Leavitt and Roedel

[57] ABSTRACT

A compact tabletop machine for making laminations such as labels of the type including a central substrate layer and first and second outer layers having inside glue-bearing faces in face-to-face contact with opposite faces of the central layer.

1 Claim, 5 Drawing Sheets

COMPACT TABLETOP MACHINE FOR MAKING LABELS AND OTHER LAMINATIONS

BACKGROUND OF THE INVENTION

This invention relates generally to apparatus for making laminations (e.g., labels) and, more particularly, to a compact lamination-making machine especially designed for placement and use on the top of a table (e.g., a desk).

The machine of this invention is particularly, albeit not exclusively, suited for making laminated labels of the type comprising a central layer of printable substrate material disposed between first and second cover layers, and a peel-off backing layer. Heretofore, large label manufacturers have used machines of various types to make large quantities of labels for sale to their customers, one such machine being described in U.S. Pat. No. 4,594,125. Because of their large size, high cost and complexity, these machines have not been generally suitable for purchase by individual customers for in-house use. Accordingly, there is a need in the industry for a small lamination (e.g., label)-making machine which is easy to use and maintain in-house by such customers.

SUMMARY OF THE INVENTION

Among the several objects of the invention may be noted the provision of a compact tabletop machine which is adapted for making labels and other laminations (e.g., identification cards, patterned adhesive laminates, etc.) and which is especially suited for in-house use for those having a need for such laminations; the provision of such a machine which is relatively small in size (less than about two feet in front-to-back direction) so that it may conveniently be placed and operated on a tabletop, for example; the provision of such a machine which uses printable substrate material of standard size (e.g., 8½ in. by 11 in. paper stock or A-4 paper stock); the provision of such a machine which does not require the use of the liquid or the application of heat to the label materials; the provision of such a machine which is capable of relatively high-speed operation; the provision of such a machine which is fully automated and easy to operate; the provision of such a machine which is easy to maintain; the provision of such a machine which is readily convertible to make a variety of different types of laminations; and the provision of such a machine which is clean and neat in appearance.

Generally a compact tabletop lamination-making machine of the present invention is adapted for making laminations, such as labels of the type comprising a central substrate layer and first and second outer layers having inside glue-bearing faces in face-to-face contact with opposite faces of the central layer. The machine comprises a housing having a front wall, a rear wall and opposite side walls, means adjacent the front wall of the housing for holding a stack of sheets of substrate material about 8½ in. wide by about 11 in. long, means for feeding individual sheets from said stack one after another at a substantially uniform rate for travel along a path extending generally in front-to-rear direction through the housing with the leading edge of one sheet closely adjacent the trailing sheet in front of it, control means on the housing manually operable for controlling operation of the machine, including operation of said feeding means, first roller means in the housing for mounting a first supply roll of web material corresponding to said first outer layer for rotation about an axis extending side-to-side with respect to the housing, second roller means in the housing for mounting a second supply roll of web material corresponding to said second outer layer for rotation about an axis extending side-to-side with respect to the housing, means in the housing for combining said sheets and said web materials as the sheets are fed forwardly and as the web materials are pulled from respective first and second supply rolls to form a laminated strip, said combining means being operable to press inside glue-bearing faces of web material pulled from said first and second supply rolls against opposite faces of each sheet of substrate material to form said outer layers, and die cutting means in the housing downstream from said combining means for cutting through said outer layers of the laminated strip to form individual labels or the like. The die cutting means comprising a first die cutting station and a second die cutting station downstream from the first station. The length of said path through the housing from immediately upstream of said combining means to immediately downstream from the second die station is not substantially more than the combined lengths of two sheets, and the distance between the front and rear walls of the housing is less than about two feet for enabling placement of the machine on a tabletop.

Other objects and features will be in part apparent and in part pointed out hereinafter.

BRIEF DESCRIPTION OF THE DRAWINGS

Corresponding parts are indicated by corresponding reference numerals and/or characters throughout the several views of the drawings.

DESCRIPTION OF THE PREFERRED EMBODIMENT

Figure 1:
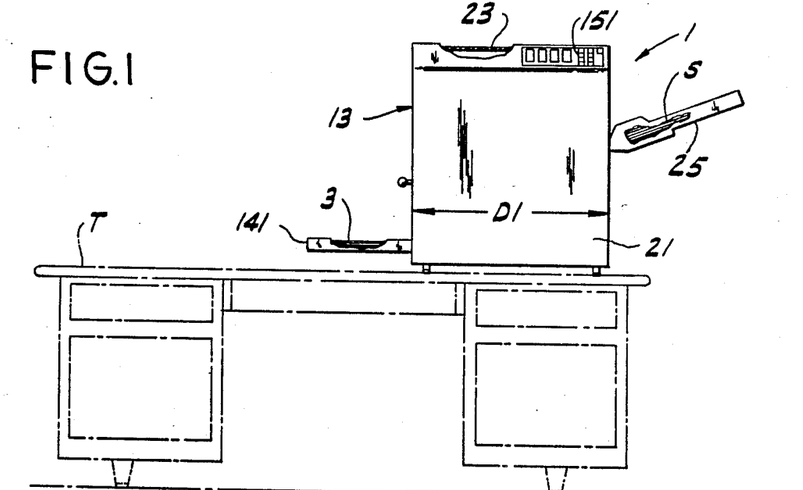
FIG. 1 is a side elevation of a tabletop labelmaking machine of the present invention.
Figure 2:
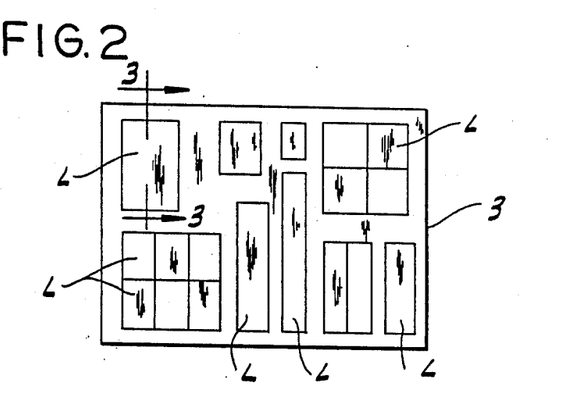
FIG. 2 is a plan view of a sheet of labels made by the machine of FIG. 1.
Figure 3:
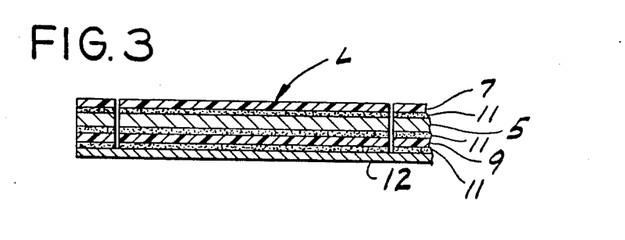
FIG. 3 is an enlarged section on line 3—3 of FIG. 2.

Referring now to the drawings, and first more particularly to FIGS. 1–3, there is generally indicated at 1 a machine of the present invention for making sheets 3 of laminated labels L. The machine 1 is relatively small and compact for placement and operation on a tabletop T (the front-to-back dimensions of the machine being less than about two feet) and is especially although not exclusively adapted for making labels of the type shown in FIG. 3. As there illustrated, the label L comprises a central substrate layer 5 of printable relatively inexpensive material disposed between first (upper) and second (lower) outer layers designated 7 and 9, respectively, of clear plastic film having inside glue-bearing faces in face-to-face contact with the opposite faces of the substrate layer 5 (the glue being indicated at 11), and a pressure-sensitive peel-off backing layer 12 of suitable backing material.

The machine 1 comprises a housing, generally designated 13, having a front wall 15 at the front of the machine, a rear wall 17 at the back of the machine, opposite side walls indicated at 19 and 21, respectively, and a top 23. An infeed tray 25 detachably mounted on the housing 13 adjacent its front wall 15 constitutes means for holding a stack of sheets S of substrate material, the sheets preferably being standard-size sheets of paper stock 8½ in. wide by 11 in. long or A4-size paper having printing thereon corresponding to the printing to appear on the finished labels L. Means indicated generally at 27 (FIG. 6) is also provided for feeding individual sheets S lengthwise one after another from the top of the stack at a substantially uniform rate for travel along a path extending generally in front-to-rear direction (from right to left as viewed in the drawings) through the housing 13 with the leading edge of each sheet closely adjacent the trailing edge of the sheet in front of it.

Figure 4:
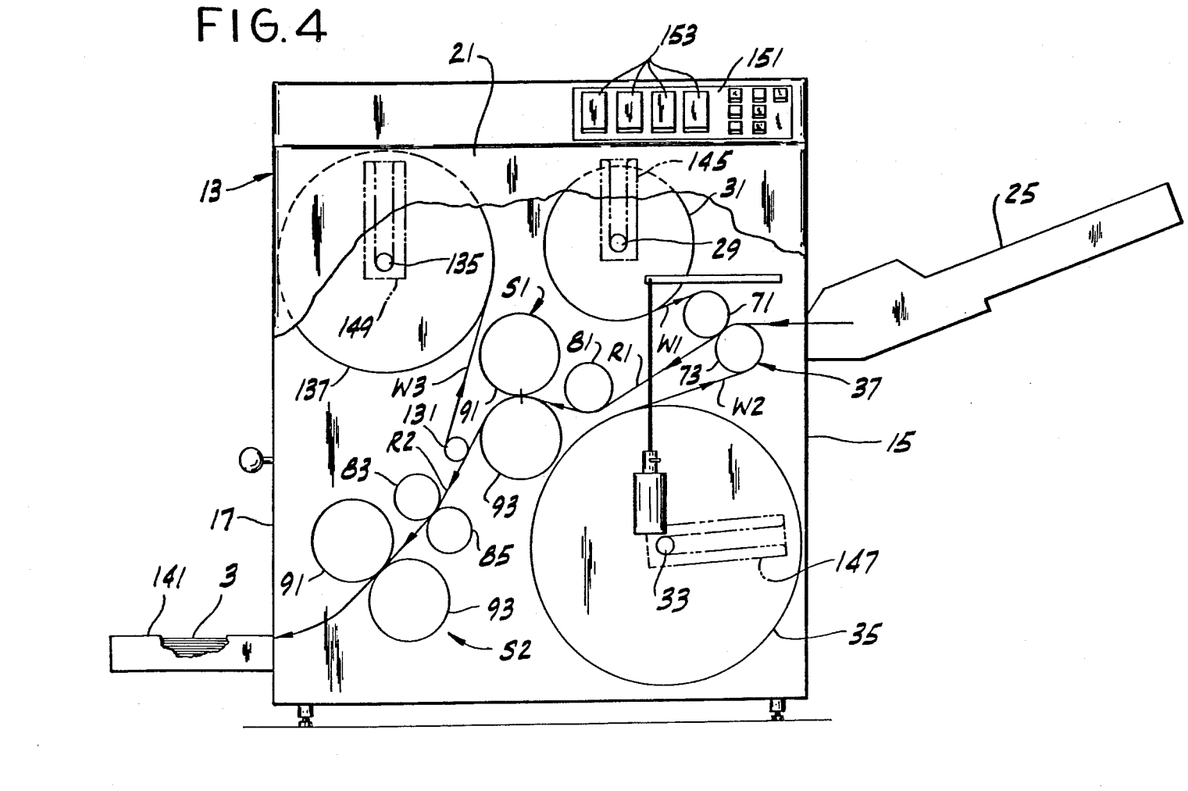
FIG. 4 is schematic side elevational view showing selected components of the machine.
Figure 5:
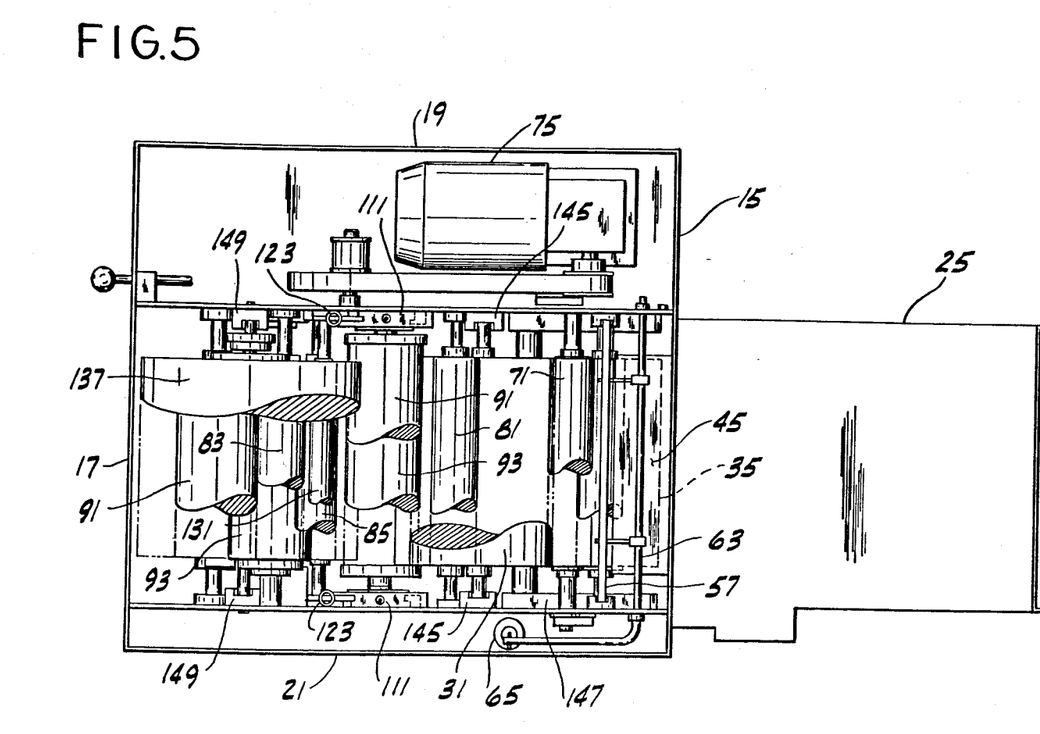
FIG. 5 is a plan view of the machine with the top removed, portions of various rolls being broken away for clarification.

As best illustrated in FIGS. 4 and 5, the tabletop machine 1 includes a first roller 29 (constituting first roller means) extending horizontally between the side walls 19, 21 of the housing generally in the upper front quadrant of the housing for rotatably mounting a first supply roll 31 of web material W1 corresponding to the first (upper) outer layer 7 of label L, and a second roller 33 (constituting second roller means) extending horizontally between the side walls of the housing generally in the lower front quadrant of the housing for rotatably mounting a second supply roll 35 of web material W2, the latter being a composite web having preassembled layers corresponding to the second (lower) outer layer 9 and backing layer 12. It will be understood that web material corresponding to the second (lower) outer layer and the backing layer could be provided on separate rolls mounted on separate rollers without departing from the scope of this invention. Other parts of the machine include means in the housing generally indicated at 37 for pulling the webs W1 and W2 from their respective supply rolls and combining them with sheets S to form a laminated or composite strip 41 of label material (see FIG. 6) having the cross-sectional configuration shown in FIG. 3, and die cutting means comprising first and second die cutting stations designated S1 and S2, respectively, downstream from the combining means 37 for die cutting the laminated strip 41.

Figure 6:
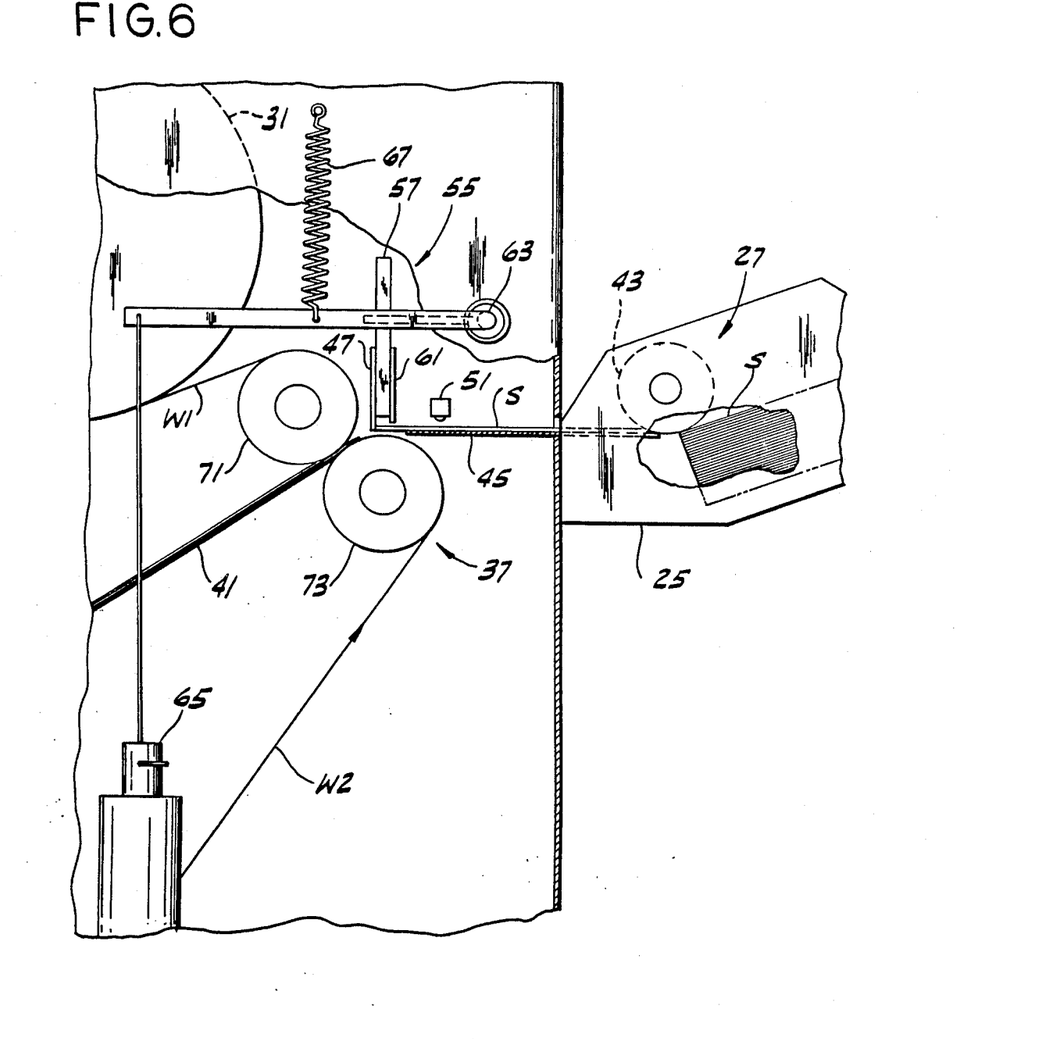
FIG. 6 is a side elevation showing a feeding mechanism.

More specifically, as shown in FIG. 6, feeding means 27 comprises a power-driven friction roller 43 in the feed tray 25 frictionally engageable with the top sheet 5 in the stack to feed the sheet forward into the housing 13 over a generally horizontal support plate 45 for impact against the bottom portion of a vertical plate 47 extending in side-to-side direction with respect to the housing and generally transversely with respect to the direction of feed. The result of this impact is that the sheet is momentarily stopped and squared relative to its path of travel through the machine before it is fed forward to the combining means 37. A photoelectric device 51 is positioned upstream from the vertical plate 47 to detect movement of the leading edge of a sheet 5 therepast. Appropriate circuitry is provided to deactivate the power roller 43 after a first relatively short delay from such detection, and to reactivate the power roller after a second longer delay from such detection to feed another sheet into the machine. The first delay is timed so that the power roller 43 continues to rotate for a short time after impact of the sheet against the plate, which forces the sheet against the plate to ensure alignment of the sheet relative to the desired direction of feed.

If desired, the infeed tray 25 may be detached from the machine and individual sheets hand fed into the machine by sliding the sheets across support plate 45, past the photoelectric device and against the vertical plate 47.

While a sheet S is momentarily stopped by plate, means indicated generally at 55 in FIG. 6 is adapted for lightly pressing or tapping the leading edge of the sheet downwardly into engagement with the upper surface of web W2. Means 55 comprises a tapping member 57 in the form of a generally rectangular vertically-disposed plate extending in side-to-side direction with respect to the housing and generally transversely with respect to the direction of feed of sheets S. The tapping member 57 is movable up and down in timed relation to the forward feed of sheets S into the machine, the tapping member being movable downwardly to press a sheet S momentarily stopped by plate against the glue-bearing face of the lower web W2 thereby to tack the sheet to the web for conjoint forward movement of the web and sheet to the combining means 37. The tapping member is guided for up and down movement by guide means comprising a front guide member indicated at 61 and a rear guide member constituted by plate 47, the latter of which is spaced rearwardly from the front guide member 61 with its lower end extending down below the front guide member for impact of a sheet S thereagainst. The tapping member 57 is connected to a horizontal rod 63 journalled in the side walls 19, 21 of the housing. The rod 63 is adapted to be rotated in one direction (counterclockwise as viewed in FIG. 6) upon energization of a solenoid 65 to effect downward movement of the tapping member. Upon deenergization of the solenoid the rod rotates in the opposite direction under the bias of a spring 67 thereby to effect upward movement of the tapping member. Energization of the solenoid is synchronized with the detection of the leading edge of a sheet S by the photoelectric device, the operation being such that the downward movement of the tapping member 57 to press the leading edge of the sheet against the web W2 occurs substantially simultaneously with the impact of the sheet against the plate.

Combining means 37 comprises upper and lower combining rolls, designated 71 and 73 in FIG. 6, respectively, mounted for rotation about generally parallel horizontal axes extending in side-to-side direction with respect to the housing 13 immediately downstream from the pressing means 55 in a position to receive sheets S therebetween as they move forward with web W2. The combining rolls 71, 73 are adapted to press the inside glue-bearing surfaces of webs W1 and W2 pulled from supply rolls 31 and 35 against opposite (upper and lower) faces of each sheet to form the above-mentioned composite strip 41. The ends of the combining rolls are journalled in suitable bearings secured to the side walls of the housing. The lower roll 73 is driven by a motor 75 at one side of the housing. The upper combining roll 71 is preferably vertically movable relative to the lower roll 73 between an open position in which the rolls are gapped to facilitate initial threading of the susbstrate 5 and web materials W1, W2 therebetween, and a closed postion in which the rolls are adapted for pressure engagement with the substrate and web materials for drawing them forward and combining them.

As illustrated in FIG. 4, the path of travel of the composite strip 41 through the machine downstream of the combining rolls comprises a first reach R1 which slopes relatively gradually rearwardly and downwardly from the combining rolls 71, 73 to an idler roll 81 and thence upwardly to the first die station S1 centrally located with respect to the housing, and a second reach R2 which slopes relatively steeply downwardly and rearwardly from the first die cutting station through a pair of nip rolls 83, 85 and thence to the second die cutting station S2 located in the lower rear quadrant of the housing. The nip rolls 83, 85 are adapted to be rotated at a speed faster than the speed at which the composite strip 41 travels forwardly (slippage occurs between the nip rolls and the strip) thereby to maintain the composite strip in tension and to provide for positive feed of the strip to die station S2. Each of the first and second reaches R1 and R2 is approximately equal to the length of one sheet S (that is, about eleven inches).

The first die cutting station S1 comprises a die roll and an anvil roll designated 91 and 93, respectively. The die roll 91 may be a standard die roll suitably engraved, for example, to cut labels of the desired configuration in the laminated strip. For the sake of compactness, the die and anvil rolls are relatively small in diameter, with the die roll having a circumference equal to the length of the paper being handled (about eleven inches). In one embodiment, the die and anvil rolls are rotatable about their respective axes with their cylindric surfaces so spaced with respect to one another that when the laminated strip passes therebetween the die roll is adapted to cut through the substrate sheet and the outer cover layers, but not the backing layer, to form individual labels L on the backing layer, as shown in FIGS. 3 and 4. The anvil roll 93 is driven by motor 75 and is geared to the die roll so that both rolls are positively driven in unison.

Figure 7:
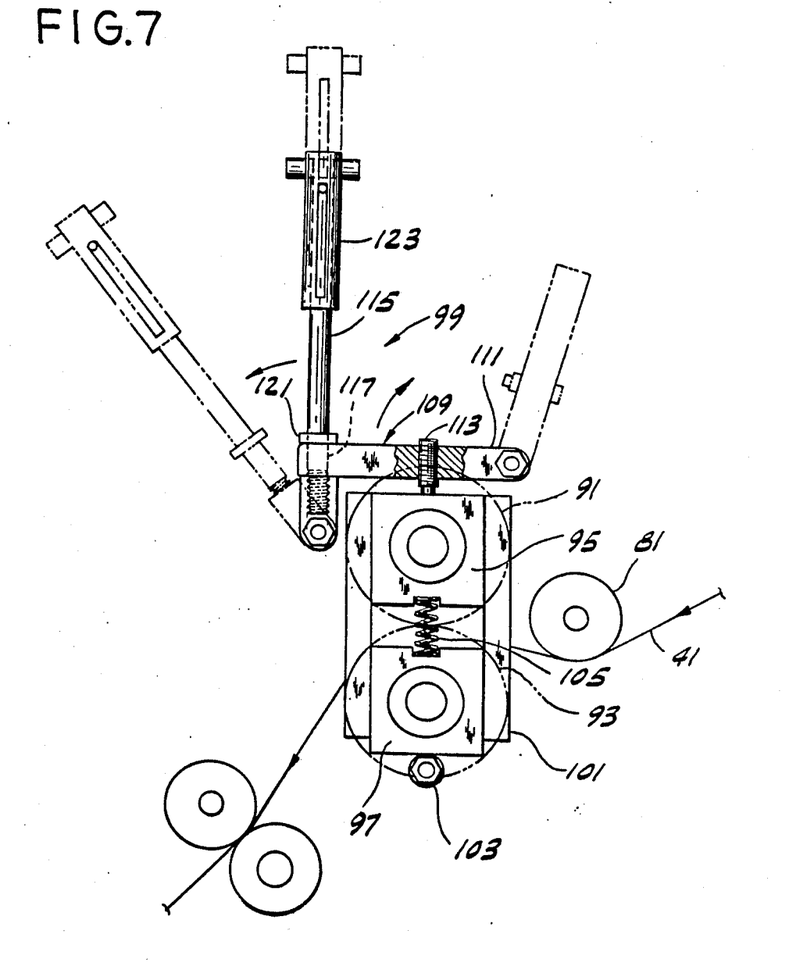
FIG. 7 is a side elevation showing a quickrelease mounting arrangement for die and anvil rolls in the machine.

The ends of the die and anvil rolls 91, 93 are journalled in bearing blocks 95, 97 which are designed for rapid mounting and demounting from the housing by quick-release means generally indicated at 99 in FIG. 7. Means 99 comprises a quick-release assembly on each side wall of the housing comprising a guide channel 101 for guiding a respective pair of bearing blocks in the guide channel for vertical movement relative to one another to vary the distance between the the die and anvil rolls, a stop 103 at the lower end of the guide channel engageable by the the lower (anvil) bearing block 97 to limit downward movement of the bearing block in the guide channel 101, and a coil compression spring 105 urging the upper (die) bearing block 95 upwardly away from the lower bearing block 97. Also provided is pusher means, generally indicated at 109, at the upper end of the guide channel 101 movable between an operative postion (shown in solid lines in FIG. 7) for pushing the upper (die) bearing block 95 down against the urging of spring 105 toward the lower (anvil) bearing block 97, and a release position (shown in phantom) enabling the bearing blocks 95, 97 and die and anvil rolls 91, 93 to be removed from the guide channel to facilitate replacement or repair.

Specifically, pusher means 109 comprises a pivot bar 111 pivotable on an axis extending in side-to-side direction with respect to the housing 13 from the stated operative position in which the bar assumes a generally horizontal position spanning the upper end of the guide channel 101 and the stated release postion in which the bar is swung up and away from the open upper end of the guide channel to permit the bearing blocks 95, 97 to be slidably removed via the open top of the guide channel. A screw member 113 threadable in the pivot bar is adapted to be bought into pressure engagement with the upper (die) bearing block 95 when the pivot bar is in its operative position thereby to apply the required downward force on the bearing block to obtain the proper spacing between the die and anvil rolls. Pusher means 109 also includes a holddown bar or lever 115 pivotable about an axis extending in side-to-side direction with respect to the housing from a generally upright position (shown in solid lines in FIG. 7) in which it is received in a notch 117 in the outer free end of the pivot bar 111, toward an angled position (shown in phantom) in which it is clear of the notch. The holddown bar 115 has a nut 121 threadable on the bar. When the hold-down bar is in its upright postion, this nut 121 is adapted to be threaded down on the bar into engagement with the top of the pivot bar 111 to hold the latter in its operative postion. To facilitate swinging the hold-down bar, an extensible handle 123 is provided at the upper end of the bar.

A separator roll 131 and take-up roller 135 are provided downstream from the first die station S1 for stripping a web W3 of scrap material (sometimes referred to in the trade as the "matrix") from the laminated strip 41 and taking it up in a roll 137, such scrap being constituted by those portions of the substrate sheets and outer layers 7, 9 between the labels L die cut in the strip.

The second die station S2 is substantially identical to the first die station except that the die and and anvil rolls (also designated 91 and 93, respectively) are oriented at an angle (rather than vertically) with respect to one another. The die roller 91 at the second die station S2 may be formed for cutting through the laminated composite strip at suitable intervals (e.g., between sheets S) to produce separate sheets 3 of labels, the sheets then being gravity fed into the outfeed tray 141 attached to the back wall of the machine. Alternatively, the die roll 91 at the second station may perform some function other than sheeting (e.g., perforating or scoring), in which case the finished composite strip may be wound up on a roller mounted at a suitable location in the machine.

The positions of the die and anvil rolls 91, 93 at the first and second die stations S1 and S2 may be reversed for cutting up through the bottom of the laminated composite strip 41.

For ease of removal and installation, the ends of each of the rollers 29, 33 and 135 mounting rolls 31, 35 and 137, respectively, are received in a pair of parallel channels mounted on opposite side walls of the housing, the channels for roller 29 being designated 145 (see FIG. 4), the channels for roller 33 being designated 147, and the channels for roller 135 being designated 149. The channels 145, 147 and 149 are open at their outer ends so that the rollers may be readily removed from the channels simply by moving the ends of the rollers outwardly in the channels and out of the open upper ends thereof. To reinstall the rollers, they are simply lowered into the channels until the ends of the rollers come to rest against the bottom of the channels, as illustrated in FIG. 4. To facilitate installation and removal of the rollers 29 and 135, the top 23 of the machine is preferably either removable entirely from the housing 13 or hinged on the housing for swinging up and out of the way. Doors (not shown) may be provided at the front of the housing to permit ready installation and removal of roller 133. The fact that rolls 31, 35 and 37 are readily removable enables the machine to be quickly and easily converted for making laminations of different size or material.

Suitable control means comprising a control panel 151 conveniently located on the housing is provided for controlling operation of the machine. Pushbuttons 153 on the control panel connected to appropriate circuitry known to those skilled in the art control various functions of the machine, including start-up and operation of the motor 75 and transmission to rotate the various driven rolls in the machine in either a continuous mode, as during automatic feeding of sheets into the machine by feeding means 27, or in an intermittent mode to jog the composite web 41 forward in selected increments (in increments corresponding to the length of one sheet, for example, or shorter increments such as one-inch increments), as during hand feeding.

It will be observed from the foregoing that the design of the machine 1 of the present invention enables it be built very compactly and to handle standard size 8½ in wide by 11 in. long paper or A4 size paper. It will be noted in this regard that the length of the path of travel of a sheet 5 through the housing from a point immediately upstream from the combining rolls 71, 73 to a point immediately downstream from the die and anvil rolls of the second die station S2 is not substantially more than the combined lengths of two sheets (that is, about twenty-two inches). This enables the machine to be built with a front-to-rear dimension D1 of less than about two feet for enabling placement and operation of the machine on a tabletop.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tabletop machine for making laminations such as labels of the type comprising a central substrate layer and first and second outer layers having inside glue-bearing faces in face-to-face contact with opposite faces of the central layer, said machine comprising:

a housing having a front, a back and opposite side walls;

means for feeding individual sheets of printable substrate material about 8½ in. wide by about 11 in. long one after another for travel along a path extending generally in front-to-rear direction through the housing with the leading edge of one sheet closely adjacent the trailing edge of the sheet in front of it;

control means on the housing manually operable for controlling operation of the machine;

first roller means in the housing for mounting a first supply roll of web material corresponding to said first outer layer for rotation about an axis extending side-to-side with respect to the housing;

second roller means in the housing for mounting a second supply roll of web material corresponding to said second outer layer for rotation about an axis extending side-to-side with respect to the housing;

means in the housing for combining said sheets and said web materials as the sheets are fed forwardly and as the web materials are pulled from respective first and second supply rolls to form a laminated strip, said combining means being operable to press inside glue-bearing faces of web material pulled from said first and second supply rolls against opposite faces of each sheet of substrate material to form said outer layers;

die cutting means in the housing downstream from said combining means for cutting through said outer layers of the laminated strip to form individual labels or the like, said die cutting means comprising a first die cutting station and a second die cutting station downstream from the first station;

the length of said path through the housing from immediately upstream of said combining means to immediately downstream from said second die station being not substantially more than the combined lengths of two sheets, and the distance between the front and rear walls of the housing being less than about two feet for enabling placement and operation of the machine on a tabletop;

said first die cutting station comprising a die roll and an anvil roll, a pair of bearing mounting respective ends of said die and anvil rolls for rotation, and quick-release means for rapid mounting and demounting of the bearings from the housing;

said quick-release means comprising a quick-release assembly on each side wall of the housing, said quick-release assembly comprising means guiding a respective pair of bearings for movement relative to one another to vary the radial distance between said die and anvil rolls, stop means at one end of said guide means engageable by one bearing of the pair to limit movement of the bearing in one direction in said guide means, spring means urging the other bearing of the pair in the opposite direction away from said one bearing, and pusher means at the opposite end of said guide means movable between an operative position for pushing said other bearing against the urging of said spring means toward said one bearing and a release position enabling said bearings to be removed from said guide means;

said pusher means comprising a pivot bar about an axis extending in side-to-side direction with respect to the housing from said release position to said operative position in which the bar assumes a generally horizontal position above said other bearing, and a screw member on said pivot bar threadable into pressure engagement with said other bearing, said pivot bar being pivotable on its axis up away from said operative position toward said release position; and a hold-down bar pivotable about an axis extending in side-to-side direction with respect to the housing from a generally upright position in which it is engageable with the outer free end of said pivot bar to hold it in said operative position toward an angled position in which it disengages the pivot bar for enabling the latter to pivot to its release position.

* * * * *

UNITED STATES PATENT AND TRADEMARK OFFICE
CERTIFICATE OF CORRECTION

PATENT NO.  : 4,882,004

DATED       : November 21, 1989

INVENTOR(S) : Douglas M. Watson

It is certified that error appears in the above-identified patent and that said Letters Patent is hereby corrected as shown below:

Column 8, line 48, "pivot bar about", should read ---pivot bar pivotable about---.

Signed and Sealed this

Fifth Day of February, 1991

Attest:

HARRY F. MANBECK, JR.

*Attesting Officer*  *Commissioner of Patents and Trademarks*